June 5, 1934.  F. TOTZEK  1,961,258

HEAT EXCHANGER

Filed March 25, 1932

Inventor:
Friedrich Totzek

Patented June 5, 1934

1,961,258

UNITED STATES PATENT OFFICE 1,961,258

HEAT EXCHANGER

Friedrich Totzek, Essen-Stoppenberg, Germany, assignor, by mesne assignments, to The Koppers Company of Delaware, Pittsburgh, Pa., a corporation of Delaware Application March 25, 1932, Serial No. 601,107
In Germany March 30, 1931

1 Claim. (Cl. 263—51)

This invention relates to heat exchangers more particularly known as regenerators, wherein heat-resisting elements are heated by contact with hot gases, the cold gases to be heated being passed periodically over these heated elements, and relates more particularly to heat exchangers of the type referred to through which the gases to be heated are passed in horizontal direction.

The object of my present invention is to provide an improved heat exchanging arrangement for gases through which the gases flow in horizontal direction through regenerators and which is provided with heat transferring bodies which are simple and cheap to make and also yield a high degree of efficiency in the regenerator.

According to my present invention the regenerative filler is constituted of heat exchanging bodies comprising flat plate-shaped brick elements or bodies which with the help of distancing members arranged in checker form are set in the regenerator chamber in superposed horizontal layers one above the other in such manner as to form a number of hollow horizontal gas flow spaces in the regenerator which superposed bodies restrict vertical flow of gas from one horizontal gas flow space to another during flow of the gases under treatment through the spaces between each two of the superposed bodies, as would occur with vertical flow regenerators above described, during the horizontal flow of gas from one end of the regenerator to the other. Each of the plate shaped bodies are provided with parallel rows of heat regenerative stud members, with the stud of adjacent rows in spaced relation to each other and staggered checker fashion. The stud members are perpendicular to the plate shaped bodies and extend between each two superposed bodies and are of less horizontal dimensions than the space between each two of them in the same row so as to effect a lateral rather than vertical zig-zag distribution of gas during gas flow between the plate-shaped bodies which is lacking in the prior structures using hollow annular bodies of cylindrical or rectangular cross-section as above referred to.

A further object of my present invention is to provide a new and improved heat transferring element for use in the new regenerators invented by me.

This new heat transferring element consists essentially of a plate-shaped brick body provided on the upper side, or on both upper and lower sides, as indicated by the dotted lines in Fig. 2, with projections which act as distancing members when the heat transferring plates are laid on each other in the regenerator. The formation of such projections in moulding the plates is relatively simple and adds practically nothing to the cost of manufacture. Heat transferring plates provided with such projections do away with the necessity for separate distancing elements.

I prefer to dispose the projections in chequer form on the plates in such a manner that in flowing over the upper and lower sides of the plates the gases are diverted numerous times.

With these and other objects of my invention in view I will now describe the nature of the present invention with particular reference to the accompanying drawing in which:—

Figure 2 is a side elevation of a heat transferring plate constructed in accordance with my present invention, while

Figure 1:
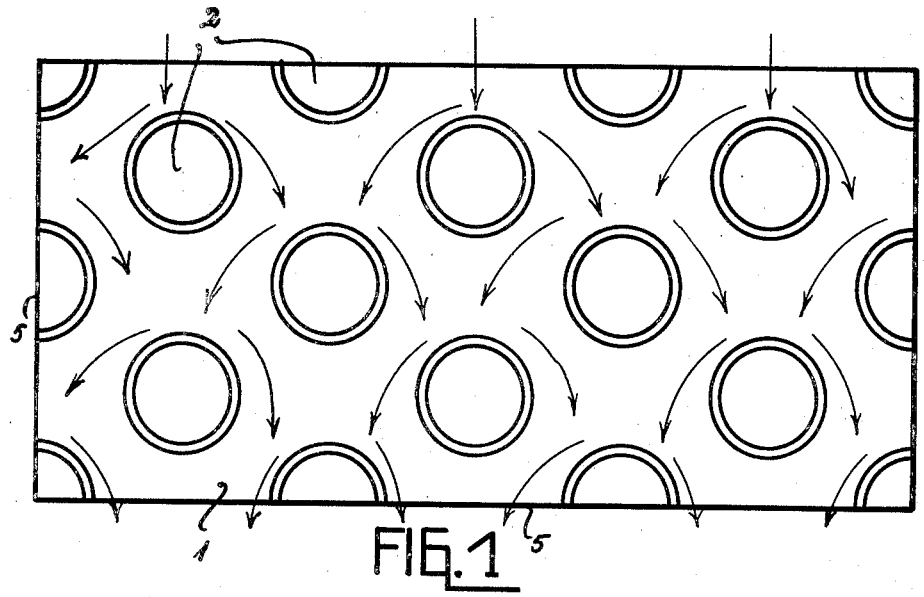
Figure 1 is a plan.

The heat transferring element shown in Figure 1 consists of a flat stone plate 1 formed with a flat upper or lower surface and consisting of a suitable refractory material such for instance as chamotte or silica or sillimanite. On the upper surface of the plate a series of projections 2 is provided which as shown in Figure 1 are disposed in checkered fashion.

Figure 2:
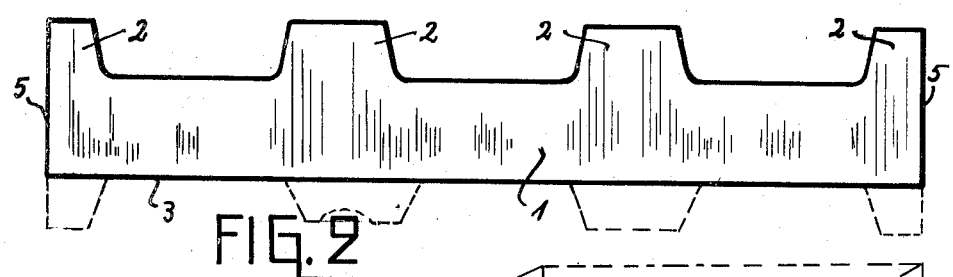
Figure 3:
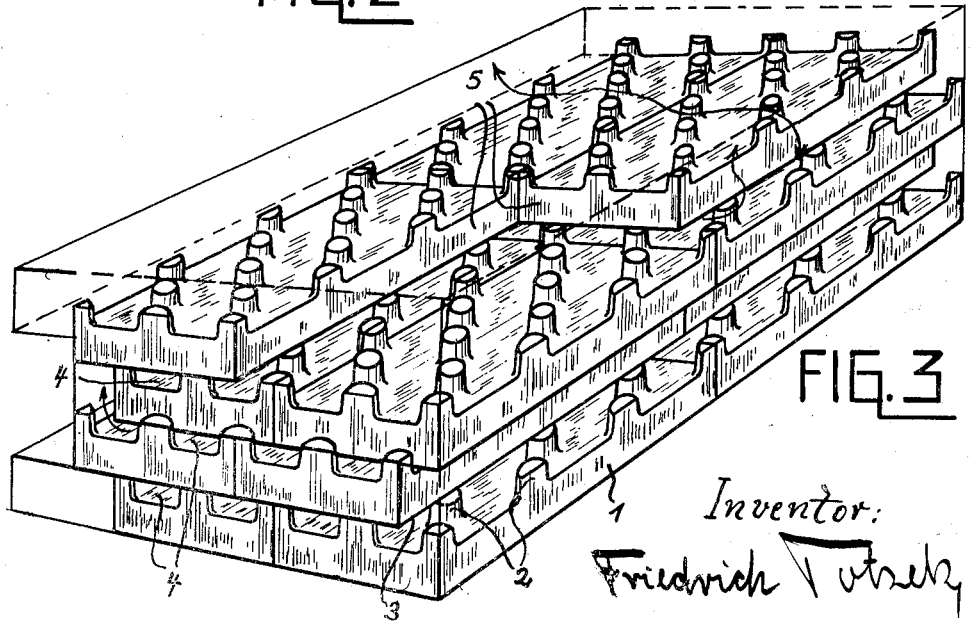
Figure 3 illustrates part of a filling for heat exchangers composed of the plates illustrated in Figures 1 and 2.

As indicated in Figure 3 when building the plates according to Figures 1 and 2 into the heat exchanger they are superimposed in such a manner that the plane lower side 3 of one plate rests on the projections 2 of the lower plate so as to form between the plates flat hollow spaces or cavities 4 for the passage of the gases under treatment. The narrow sides 5 of the plates are set firmly against each other in each layer of plates so that the gases flowing through the spaces 4 cannot pass or can only pass to a very small degree from one space 4 into those situated above or below it.

As shown in Figure 2 the projections 2 are tapered slightly towards the top. This form of projection is selected in order to permit simplicity and convenience of manufacture when moulding the plates. Finally it is possible to provide the projections on both top and bottom surfaces of the plates. In this case it is preferable so to arrange the plates above each other that the projections of one plate engage in the spaces between those of the adjacent plates. This construction enables the number of projections for diverting the gas currents to be increased without rendering the manufacture of the plates difficult owing to a too close disposition of the projections.

I do not desire my present invention to be restricted to the special embodiment hereinbefore described, on the contrary it may be varied as desired within the scope of the claim hereinafter made.

I claim:—

A heat regenerator filler for a horizontal flow regenerator chamber comprising superimposed vertical-flow restricting plate-shaped heat transferring bodies arranged horizontally one above the other so as to provide horizontal gas flow spaces for horizontal gas flow between each two heat transferring bodies, each of the plate-shaped bodies having parallel rows of heat regenerative stud members thereon with the members of adjacent rows in spaced relation to each other and staggered in checker fashion, the stud members being perpendicular to the plate shaped bodies, extending between superposed plate shaped bodies and being of less horizontal dimensions than the space between each two of them in the same row so as to effect a lateral rather than a vertical zig-zag distribution of gas in the spaces between each two of the superposed plate shaped bodies during passage of gases through the horizontal gas flow spaces between each two heat transferring bodies, at least some of the stud members of each of the heat transferring bodies being in supporting engagement with the next adjacent heat transferring bodies for supporting said bodies in said superposed relationship in said chamber.

FRIEDRICH TOTZEK.